United States Patent [19]

Pardo, Jr. et al.

[11] 4,210,415

[45] Jul. 1, 1980

[54] SHRINKPROOFING OF FABRICS OF WOOL

[75] Inventors: Clay E. Pardo, Jr., Albany; Robert E. Foster, Concord, both of Calif.; Willie Fong, deceased, late of Richmond, Calif., by Yukiye Fong, executrix

[73] Assignee: The United States of America as represented by the Secretary of Agriculture, Washington, D.C.

[21] Appl. No.: 785,615

[22] Filed: Apr. 7, 1977

[51] Int. Cl.$^2$ .................. D06M 3/02; D06M 13/00
[52] U.S. Cl. .................................. 8/128 A; 8/128 R; 8/192; 8/DIG. 11; 8/DIG. 18
[58] Field of Search ............ 8/128 A, 31 A, DIG. 11, 8/DIG. 18, 192, 195

[56] References Cited

U.S. PATENT DOCUMENTS

| 3,084,018 | 4/1963 | Whitfield et al. | 8/128 |
| 3,084,019 | 4/1963 | Whitfield et al. | 8/128 |

OTHER PUBLICATIONS

The Oxford English Dictionary, vol. IX (Oxford), p. 497.

Primary Examiner—A. Lionel Clingman
Attorney, Agent, or Firm—M. Howard Silverstein; David G. McConnell; Theodore J. Leitereg

[57] ABSTRACT

Knitted fabrics are fulled and shrinkproofed by a process wherein a loosely-knitted fabric is exposed to a diisocyanate. The so-treated material is then fulled and treated with a polyamine, whereby a polyurea is formed on the surface of the fibers and the fabric thus becomes shrinkproofed.

13 Claims, No Drawings

SHRINKPROOFING OF FABRICS OF WOOL

BACKGROUND OF THE INVENTION

1. Field of the Invention

This invention relates to and has among its objects the provision of improved methods for shrink-proofing knitted fabrics. Further objects of the invention will be obvious from the following description wherein parts and percentages are by weight unless otherwise specified.

2. Description of the Prior Art

In the production of certain woolen knit clothes—for example, overcoats, men's suits, women's skirts, lamb's wool sweaters, and the like—a good thick cloth is preferred, i.e., one in which the threads are so close together and so intermingled that details of the weave cannot be seen even on close inspection. The method usually adapted for the manufacture of such goods is to weave the cloth with the threads normally spaced, and then to make the weave thicker or "fuller." This operation is referred to normally as fulling or milling and is well-known in the art. In such a process the woolen fibers become progressively entangled by means of agitation. The entanglement draws the fibers together, making the fabric denser and more visually and tactily pleasing. Typically, woolen fabrics are fulled by agitating the fabric in a warm, soapy solution for a period of time. This fulling operation is always carried out prior to shrink-resisting the fabric.

In the prior art as exemplified in U.S. Pat. No. 3,084,019 (Whitfield et al) it is known that wool can be shrinkproofed by a process wherein the wool is serially impregnated with two solutions, one solution containing a diamine dispersed in water; the other, a diisocyanate dispersed in an inert, volatile, essentially water-immiscible solvent. In this way a resinous polyurea is formed in situ on the surface of the wool fibers and the fibers become less susceptible to shrinkage.

In attempting to produce a fulled, shrinkproof fabric in accordance with Whitfield et al. one would proceed by first fulling the material as described above, i.e., by agitating in an aqueous solution. At this stage, the fulled fabric can be dried and then shrinkproofed according to the Whitfield process. Alternatively, the fulled fabric can be treated in the wet state provided the polyamine solution is applied to the fabric prior to the diisocyanate solution. If the diisocyanate solution is applied first, the diisocyanate will react with residual water and thus be rendered ineffective as an agent complimentary to a diamine in polyurea formation.

Although diamine addition followed by diisocyanate addition will result in polyurea formation on the fabric, this order of addition is not suitable for industrial scale operations. The fabric must be dried following exposure to the polyamine solution; otherwise, the diisocyanate solution will become contaminated with polyamine rendering the diisocyanate solution useless for subsequent reactions. In addition, undesirable fouling of equipment occurs because of extraneous polyurea resin formation, i.e., other than on the fabric.

However, drying the fabric after exposure to the diamine is not feasible because the fabric discolors (yellows) and degrades under alkaline conditions at elevated temperatures.

For the above reasons, therefore, the fulled fabric must be dried prior to application of the diisocyanate solution. Additional drying steps are costly with respect to both time and energy.

SUMMARY OF THE INVENTION

The invention described herein provides means for obviating the problems outlined above. In accordance with the process of the invention, a diisocyanate is applied to a loosely-knitted fabric. Following said application, the fabric is fulled in a conventional manner. Finally, the fulled fabric is treated with an aqueous polyamine solution whereby the material becomes shrinkproofed.

In the following description application of the invention to loosely-knit fabrics of wool is discussed by way of illustration and not limitation. In its broad ambit the invention is applicable to fabrics of all kinds, such as cotton, rayon, dacron, and the like and to knits of all types such as worsted, and so forth.

It should be noted that the success of the sequence of the invention is wholly unpredictable in view of the prior art. In particular, it is well-known that diisocyanates are readily hydrolyzed in an aqueous medium. Consequently, one would expect that the fulling operation, involving agitation in an aqueous medium, would destroy the activity of the diisocyanate if this agent is applied prior to the fulling step. We have discovered that the diisocyanate remains intact during the fulling and is, therefore, quite reactive toward the aqueous polyamine solution when this agent is applied subsequent to the fulling operation. The diisocyanate and the polyamine react to produce in situ on the fibers a high molecular weight, resinous polyurea which coats the fibers and renders them shrinkproof. The polymer formed is insoluble so that the shrinkproofing effect is durable. Heat-curing of the treated fabric is unnecessary; thus, the fabric can be immediately scoured to remove any unreacted polyamine. The original dimensions are retained even after repeated washings with soap and water or detergent and water formulations. Of equal importance, the fulled fabric retains its appealing texture and appearance.

As noted above, the treatment in accordance with the invention renders the treated wool essentially shrinkproof so that garments produced from the treated wool may be laundered in conventional soap and water or detergent and water formulations with negligible shrinking or felting. Further, the treated wool or garments prepared therefrom are in the "easy-care" category in that after washing and tumble drying, they are quite free from wrinkles so that they require only a minor amount of pressing. In addition, the treatment does not cause any degradation of the wool so that there is no significant loss of tensile strength, abrasion resistance, resiliency, elasticity, etc. Moreover, since the polymer is formed in situ on the fibers—in contrast to systems wherein polymers are spread en masse over the face of a fabric—there is substantially no loss of porosity of the fabric. A further item is that the treated wool may be dyed with conventional wool dyes to obtain brilliant, level dyeings.

Another feature of the invention is that the high molecular weight resinous polyureas are formed at ordinary (room) temperature, which is in sharp contrast to the much higher temperatures, customarily over 200° C., required in the conventional melt condensations used in preparing such polymers.

A particular advantage of the invention is that no additional step need be applied to the fabric after treatment with the polyamine to remove relaxation shrinkage. Conventionally, after the fabric has been shrink-proofed with a solvent applied resin, it must be wet-processed, i.e., it must be treated with water and subjected to very mild controlled mechanical agitation, whereby knitting stresses are removed from the woven fabric.

Another important feature of the invention is that hydrogenated diisocyanates can be used. Thus, undesirable yellowing of fabrics in sunlight that occurs if unsaturated diisocyanates are employed is avoided.

A remarkable feature of the invention is that polymers formed on the wool fibers are chemically bonded to the wool; that is, the added polymer is grafted onto the wool. The mechanism by which the graft polymerization occurs is believed to involve a reaction of functional groups on the diisocyanate with the free amino or hydroxy groups present in the wool molecule, these reactions giving rise to such linkages as urea or urethane which chemically unite the wool with the polymer. Thus the graft polyureas can be postulated by the following idealized formulas:

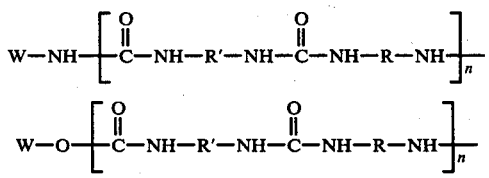

In the above formulas, W represents the polypeptide chain of the wool, containing prior to the reaction, free amino (—NH$_2$) or free hydroxy (—OH) groups. R and R' are bivalent organic radicals (representing in this case the residues of the diamine and diisocyanate, respectively) and n represents the number of polyurea repeating units.

The above formulas are obviously simplified and idealized as the polyurea chains may be attached at both their ends to a single wool molecule or they may cross-link together different wool molecules through urea or urethane linkages. The important point from a practical and realistic view is that chemical bonding of the polyurea to the wool has been practically demonstrated by virtue of its marked effect in reducing and practically eliminating felting shrinkage and the theoretical nature of the mechanism of bonding is not of real concern to the invention.

It will be evident from the description herein that the invention is of great latitude and versatility and can be employed for forming on and grafting to wool fibers a wide variety of condensation products, particularly and preferably those condensation polymers wherein the recurring structures contain at least one urea group, that is, a group of the structure

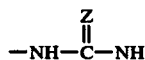

wherein Z is sulphur or oxygen.

DESCRIPTION OF THE PREFERRED EMBODIMENTS

In the practice of the invention, selection is first made of the appropriate complementary agents—herein termed Component A and Component B—required to form the desired polymer on the wool fibers. The interrelationship between the nature of the agents to be used as Components A and B and the type of polymer produced is explained in detail below. However, it is apropos to mention at this point that in general Component A may be a diisocyanate or a mixture of different diisocyanates and Component B may be a polyamine, i.e., a polyfunctional amine, or a mixture of different polyamines. Since Components A and B may be selected to form any desired type of polyurea, these components may be aptly termed as complementary organic polyurea-forming intermediates. They may further be appropriately designated as fast-reacting or direct-acting because they form the resinous polyureas rapidly and directly on contact without requiring any after-treatments, such as treatment with curing agents, oven cures, etc.

Having selected the desired Components A and B, these are formed into separate solutions for application to the wool to be treated. Generally, Component A is dissolved in perchloroethylene, 1,1,1, trichloroethane, benzene, carbon tetrachloride, toluene, xylene, ethylene dichloride, chloroform, hexane, octane, petroleum ether or other volatile petroleum distillate, or any other inert, water-immiscible solvent. Component B is dissolved in water.

In the preferred embodiment of the invention, wool is formed into a loosely-knitted fabric. Next, the fabric is treated with a solution of Component A. Generally, this treatment is accomplished by immersing the fabric in the solution, although other methods of application, such as spraying the solution onto the fabric, may be used. Prior to treatment with Component A, it may be desired to extract knitting oils and waxes from the fabric by treatment with an appropriate solvent, typically that used to dissolve Component A. After this extraction, excess solvent is removed from the fabric by centrifugation and the fabric immediately treated with a solution of Component A. It should be noted that no drying step is necessary between the solvent extraction and the exposure to Component A. In addition, both operations can be accomplished in the same apparatus, preferably a solvent processing unit, such as a dry-cleaning unit and the like, thus obviating inconvenient and time-consuming transfers.

Following treatment with Component A, the fabric is dried with recovery of solvent and transferred to a washing apparatus wherein it is fulled. In this step the fabric is immersed in water and subjected to mechanical agitation. Although not required, it is sometimes desirable to incorporate a minor proportion of a surface-active agent to facilitate the fulling operation. For this purpose one may use ordinary soap or such agents as sodium alkyl (C$_8$–C$_{18}$) sulphates, the sodium alkane (C$_8$–C$_{18}$) sulphonates, the sodium alkyl (C$_8$–C$_{20}$) benzene sulphonates, esters of sulphosuccinic acid such as sodium dioctylsulphosuccinate, and soaps, typically sodium salts of fat acids. Emulsifying agents of the non-ionic type are suitable, for example, the reaction products of ethylene oxide with fatty acids, with polyhydric alcohols, with partial esters of fatty acids and polyhydric alcohols or with alkyl phenols, etc. Typical of such agents are a polyoxyethylene stearate containing about 20 oxyethylene groups per mole, a polyoxyethylene ether of sorbitan monolaurate containing about 16 oxyethyelne groups per mole, a distearate of polyoxyethylene ether of sorbitol containing about 40 oxyethylene group per mole, iso-octyl phenyl ether of polyethylene glycol, etc. Generally, only a small proportion of surface-active agent is used, on the order of 0.05 to 0.5%, based on the weight of the solution. In general, agitation is continued for a period of 4 to 20 minutes at ordinary (room) temperature.

After removal of excess water by conventional means, such as hydroextraction (centrifugation), squeezing, and the like, the fulled fabric is treated with an aqueous solution of Component B. Generally, immersion of the fabric in this solution is the preferred technique, although other methods may be employed. Contact between the fabric and the solution of Component B is maintained from 1 to 20 minutes, depending on the reactivity of the diamine and diisocyanate.

Ordinarily, the treatment of the wool with the solutions of the complementary agents is carried out at room temperature as at such temperature the polymerization takes place very rapidly, that is, in a matter of a minute or less. If, however, a higher rate of polymerization is desired the second solution may be kept warm, for example, at a temperature up to around 50° C.

The concentration of active materials (Component A and Component B) in the respective solutions is not critical and may be varied widely. Generally, it is preferred that each of the pair of solutions contains about from 1 to 20% of the respective active component. In applying the process of the invention, enough of the respective solutions are applied to the wool to give a polymer deposit on the fibers of about 1 to 10%. Such amounts provide a substantial degree of shrinkproofing with no significant reduction in hand of the wool. Greater amounts of polymer may be deposited on the fibers if desired but tend to change the natural hand of the wool. Also, thicker deposits are likely to contain substantial amounts of non-grafted polymer. The relative amounts of Component A and Component B applied to the wool may be varied as desired for individual circumstances.

If desired, reaction promoters or catalysts may be added to the solution of Component B in order to enhance reaction between the active agents. Coming into consideration for such purpose are tertiary amines such as pyridine, dimethylaniline, quinoline, and the like; organo-tin compounds such as tributyl tin chloride, stannous tartrate, or tin salts of fat acids as stannous laurate; ferric chloride; etc. Ordinarily, however, no catalyst or reaction promoter is used as the reaction between Components A and B, applied in accordance with the procedures described herein, occurs virtually instantaneously and hence there is no need for further increasing the rate of reacton.

Following treatment of the fabric with Component B, excess water is removed from the knit, which is then washed to remove unreacted chemicals and rinsed. Finally, if desired, an aqueous solution of a commercially available softener can be applied to the fabric. In general, the composition of the softener solution is about from 1 to 5% softener, based on the weight of the fabric, in a volume of water approximately 30 times the weight of the fabric. Typically, the fabric is tumbled in this solution for a period of 3 to 5 minutes at a temperature of about 140° F. Then, the fabric is removed from the bath, hydroextracted, and tumble-dried.

The following alternative procedure may be used in place of the preferred procedure described above: Component A is applied to loose fibers, prior to knitting a fabric therefrom, in much the same way as A is applied to the knit, i.e., by immersion, spraying, or other techniques. Then, the fibers are loosely-knit into a fabric which is fulled and treated with Component B as above. In this respect, it should be recognized that it is not necessary to full the material, whether fiber or fabric, immediately after application of Component A. Rather, the fulling operation can be delayed for a period of time without deleterious effects on the subsequent polyurea formation. It is important, however, that the application of Component B follow as closely as possible the fulling operation.

It is to be noted that an important aspect of the invention is that the polyurea is formed at a solid-liquid interface, i.e., at the interface between solid Component A, previously deposited on the fibers, and the aqueous solution of Component B applied thereto. This situation is explained more fully as follows: Component A is applied to the fabric in an inert, volatile solvent, which is then recovered and the fabric dried. This fabric is now covered with a deposit of Component A in the solid state. Next, the fabric is fulled and then impregnated with Component B dispersed in water. In this way the individual fibers are layered with a superposed system of solid Component A and a solution of Component B. Under these conditions, polymerization takes place rapidly, forming the polymer in situ on the fibers and grafted thereto.

As noted briefly above, the selection of Components A and B depends on the type of polymer desired to be formed on the wool fiber and grafted thereto.

Typical examples of compounds which can be employed as Component A in a practice of the invention are described below.

As the diisocyanate one may employ any of the aliphatic aromatic, or heterocyclic compounds containing two isocyanate (—NCO) groups, preferably separated by at least two carbon atoms. The diisocyanates may be substituted if desired with non-interfering (non-functional) substituents such as ether groups, thioether groups, sulphone groups, etc. Typical examples of compounds in this category are listed below merely by way of illustration and not limitation: Ethylene diisocyanate, propylene diisocyanate, butylene diisocyanate, trimethylene diisocyanate, tetramethylene diisocyanate, hexamethylene diisocyanate, octamethylene diisocyanate, decamethylene diisocyanate, cyclohexylene diisocyanate, bis(2-isocyanatoethyl) ether, bis(2-isocyanatoethyl) ether of ethylene glycol, o-phenylene diisocyanate, m-phenylene diisocyanate, p-phenylene diisocyanate, tolylene-2,4-diisocyanate, tolylene-2,6-diisocyanate, 3,3'-bitolylene-4,4'-diisocyanate, i.e.,

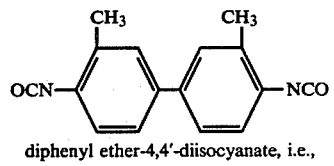

diphenyl ether-4,4'-diisocyanate, i.e.,

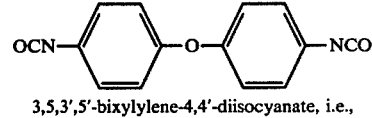

3,5,3',5'-bixylylene-4,4'-diisocyanate, i.e.,

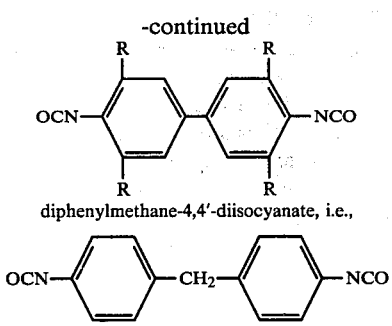

diphenylmethane-4,4'-diisocyanate, i.e., biphenylene diisocyanate, 3,3'-dimethoxy-biphenylene-4,4'-diisocyanate, naphthalene diisocyanates, polymethyl polyphenyl isocyanates, etc. It is also evident that the sulphur analogues of these compounds may be used and such are included within the spirit of the invention. Thus for example, instead of using the compounds containing two —NCO groups one may use their analogues containing either two —NCS groups or one —NCO group and one —NCS group. Another point to be made is that it is within the spirit of the invention to utilize the derivatives which yield the same products with compounds containing active hydrogen as do the isocyanates. Particular reference is made to the biscarbamyl chlorides which may be used in place of the diisocyanates. Thus one may use any of the above designated compounds which contain carbamyl chloride groups

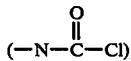

or their sulphur analogues

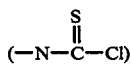

in place of the isocyanate groups.

Among the preferred compounds are the aliphatic diisocyanates, for example, those of the type

wherein n has a value from 2 to 12. Other preferred compounds are the toluene diisocyanates, xylylene diisocyanates, and diphenylmethane-4,4'-diisocyanate which may also be termed methylenebis(p-phenylisocyanate).

Typical examples of compounds which can be employed as Component B in a practice of the invention are described below.

As the polyamine one may employ diamines, i.e., any of the aromatic, aliphatic, or heterocyclic compounds containing two primary or secondary amine groups, preferably separated by at least two carbon atoms. The diamines may be substituted if desired with various non-interfering (non-functional) substituents such as ether radicals, thioether radicals, tertiary amino groups, sulphone groups, fluorine atoms, etc. Typical compounds in this category are listed below merely by way of illustration and not by way of limitation: Ethylene diamine, trimethylene diamine, tetramethylene diamine, hexamethylene diamine, octamethylene diamine, decamethylene diamine, N,N'-dimethyl-1,3-propanediamine, 1,2-diamino-2-methylpropane, 2,7-diamino-2,6-dimethyloctane, N,N'-dimethyl-1,6-hexanediamine, 1,4-diamino-cyclohexane, 1,4-bis(aminomethyl) cyclohexane, 2,2'-diaminodiethyl ether, 2,2'-diaminodiethyl sulphide, bis(4-aminocyclohexyl) methane, N,N'-dimethyl-2,2,3,3,4,4-hexafluoropentane-1,5-diamine, ortho-, meta-, or para-phenylene diamine, benzidine, xylylene diamine, m-toluylene diamine, ortho-tolidine, piperazine, and the like. If desired, mixtures of different diamines may be used. It is generally preferred to use aliphatic alpha, omega diamines, particularly of the type

wherein n has a value of 2 to 12, preferably 6 to 10. It is also within the compass of the invention to use polyamines such as diethylene triamine, triethylene tetramine, tetraethylene pentamine, and so forth.

Numerous variations of the basic procedure herein described will suggest themselves to those skilled in the art in the application of the invention without departing from the fundamentals of the invention. Some of these variations are explained below.

If desired, one may prepare a prepolymer containing internal urea units and terminal amino groups. Such prepolymers can be prepared, for example, in known manner by reacting a molar excess of diamine with a diisocyanate. The prepolymer would then be used as Component B while for Component A one would use a diisocyanate. A typical example of procedure in this area would be to use as Component B a prepolymer of the type

and to use as Component A a diisocyanate

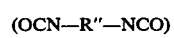

thus to produce a polymer containing repeating units of the type

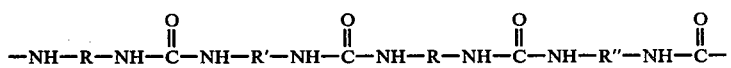

(In these formulas, R, R', and R" represent bivalent organic radicals.)

In the alternative, one may prepare a prepolymer containing internal urea units and terminal isocyanate groups. Such a prepolymer used as Component A in conjunction with a diamine as Component B would yield a polyurea similar to that shown above.

It is evident from the above description that there is a very wide choice available in the selection of the complementary agents so that generically the polyureas deposited onto the wool and grafted thereto will contain repeating units of the type

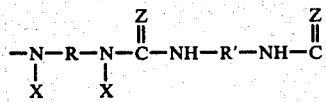

where R and R' represent bivalent organic radicals; Z represents oxygen or sulphur; and the X's taken separately represent two hydrogen atoms or two monovalent organic radicals, or taken together they represent a single divalent organic radical linking the two nitrogen atoms to which these are attached. In the preferred modifications of the invention, Z represents oxygen; R and R' represent bivalent hydrocarbon radicals or bivalent hydrocarbon radicals interrupted by internal ether (—O—) linkages; and X is hydrogen. In the especially preferred modifications of the invention, the reactants are so chosen that R and R' represent bivalent hydrocarbon radicals containing at least two carbon atoms.

Coming under special consideration, particularly because of the exceptionally high shrink resistance obtained with very small percentages of polyurea, are the use (as Component B) of xylylene diamines or aliphatic alpha, omega diamines, particularly those of the type

wherein n has a value from 6 to 10 and the conjoint use (as Component A) of toluene diisocyanate or an alkylene bis(p-phenyl isocyanate). Typical examples are the conjoint use of (B) hexamethylene diamine or metaxylylene diamine and (A) toluene-2,4-diisocyanate or methylene bis(p-phenylisocyanate).

The procedural differences between this invention and the method required by the prior art are demonstrated by the following analysis:

| Our Invention | Prior Art Method |
|---|---|
| (1) Knit fabric | (1) Knit fabric |
| (2) Transfer to solvent treating machine | (2) Transfer to washer extractor |
| (3) Solvent extract | (3) Full |
| (4) Impregnate with diisocyanate | (4) Rinse |
| (5) Recovered unused diisocyanate | (5) Hydroextract |
| (6) Dry and recover solvent | (6) Transfer fulled tumble-drier and dry |
| (7) Transfer to washer/extractor | (7) Transfer to solvent treating machine |
| (8) Full | (8) Solvent extract |
| (9) Rinse | (9) Impregnate with diisocyanate |
| (10) Apply polyamine | (10) Recover unused diisocyanate |
| (11) Recover unused polyamine | (11) Dry and recover solvent |
| (12) Scour | (12) Transfer to washer/extractor |
| (13) Rinse | (13) Apply polyamine |
| (14) Hydroextract | (14) Recover unused polyamine |
| (15) Transfer to tumble-drier and dry | (15) Scour |
| | (16) Rinse |
| | (17) Hydroextract |
| | (18) Transfer to tumble- and dry |

As can be seen in the above comparison, the prior art method requires five (5) transfer steps and eighteen (18) total steps whereas the method of the invention employs only three (3) transfer steps and fifteen (15) total steps. Furthermore, a drying step (no. 6) after the fulling step (no. 3) is required in the conventional method but not in the instant process. Consequently, the present method is less time-consuming and less energy-consuming than the known procedure.

EXAMPLES

The invention is further demonstrated by the following illustrative examples.

Wash tests were carried out according to AATCC test method No. 124IB-1973, which is briefly described as follows: Fabrics were washed at 40.6° C. in an agitator-type home washing machine with a wash cycle of 15 minutes. The so-washed materials were tumble-dried at 60.0°–71.1° C. for 30 minutes. Washing and drying cycles were repeated for a total of five each. At this point, total accumulated shrinkage, relaxation, and felting were measured.

EXAMPLE 1

A. A series of solutions of bis-(4-cyanatocyclohexyl) methane (HMDI) in perchloroethylene were prepared.

B. A solution was prepared containing 2% (by weight) of triethylene triamine and 0.2% dibutyl tin dilaurate in water.

A jersey-knit tube, 48.3 cm. long and 45.7 cm. wide, knit to cover factor (CF) of 0.85 from a 2.8 woolen run yarn (equivalent worsted yarn number (N) of 8.09) having a loop stitch length of 1.05 cm., was weighed (103.5 g.), measured, and extracted with perchloroethylene in a 10-pound dry cleaning machine to remove knitting oils and waxes. Following this extraction, excess solvent was removed from the fabric by centrifuging to 20% wet pickup of solvent, based on the weight of the fabric. A solution of Component A was added to the apparatus such that the solvent extracted fabric became immersed therein. Solvent was extracted until the wet pickup of the fabric reached 120%, based on the weight of the fabric. The so-extracted sample was tumble-dried, and solvent was recovered.

The fabric was placed in a washer-extractor unit wherein it was agitated in water at 20° C. for 6 minutes. After fulling, the fabric was hydroextracted to remove excess water. Then, a solution of Component B was added and contact maintained for 4 minutes. Immediately following this treatment, the fabric was washed for 2 minutes with 0.1% detergent (Igepal C0710, General Aniline). Next, the fabric was rinsed twice in water, each rinse being applied for 2 minutes, and treated with a 2% (based on the weight of the fabric) solution of PG Softener No. 1 (Proctor and Gamble) for 4 minutes at 140° C. The fabric was hydroextracted, tumble-dried, and tested as described above.

Other pieces of woolen knitwear were treated as described above except that the concentration of HMDI was varied. The results are summarized below.

| A (%) | Dimensions Before Fulling | | Dimensions After Fulling (6 min.) | | B (%) | Dimensions[c] after amine exposure and 5 washes | | Shrinkage | |
|---|---|---|---|---|---|---|---|---|---|
| | L[a](cm) | W[b](cm) | L (cm) | W (cm) | | L (cm) | W (cm) | L (%) | W (%) |
| 2 | 47.0 | 46.0 | 33.0 | 48.6 | 2.0 | 31.7 | 45.5 | 3.9 | 6.4 |
| 3 | 46.5 | 46.0 | 34.0 | 48.5 | 2.0 | 32.9 | 46.8 | 3.2 | 3.5 |
| 4 | 47.5 | 46.0 | 35.0 | 49.8 | 2.0 | 33.3 | 47.2 | 4.8 | 5.2 |
| Control(4)[d] | 46.0 | 46.0 | 34.0 | 48.9 | 0 | 22.1 | 35.2 | 35.0 | 28.0 |
| Control[e] | 47.5 | 45.0 | 33.0 | 48.6 | 2.0 | 21.2 | 34.0 | 35.8 | 30.0 |
| Control[f] | 44.5 | 47.0 | 33.5 | 48.5 | 0 | 19.0 | 30.1 | 43.3 | 37.9 |

[a] L = Length
[b] W = Width
[c] Samples not exposed to the amine solution were soaked for an equivalent length of time in water.
[d] Fabric was exposed to 4% HMDI solution but not to the amine solution.
[e] Fabric was exposed to the 2% amine solution but not to HMDI.
[f] Fabric was not exposed to a solution of either HMDI or amine.

EXAMPLE 2

A. A series of solutions of DDI (Dimer Diisocyanate, a 36 carbon diisocyanate produced by General Mills, Inc., Minneapolis, Minnesota) in perchloroethylene was prepared.

B. A solution was prepared containing 2% (by weight) of triethylene tetramine and 0.2% dibutyl tin dilaurate in water.

Pieces of woolen knitwear were treated with the above solution as described in Example 1. The results are summarized below.

| A (%) | Dimensions Before Fulling | | Dimensions After Fulling →(6 min.) | | B (%) | Dimensions[c] after amine exposure and 5 washes | | Shrinkage | |
|---|---|---|---|---|---|---|---|---|---|
| | L[a](cm) | W[b](cm) | L (cm) | W (cm) | | L (cm) | W (cm) | L (%) | W (%) |
| 2 | 46.0 | 45.5 | 33.6 | 47.0 | 2.0 | 32.0 | 46.5 | 4.8 | 1.1 |
| 3 | 47.5 | 46.0 | 33.6 | 47.9 | 2.0 | 33.0 | 47.0 | 1.8 | 1.9 |
| 4 | 46.0 | 46.0 | 33.8 | 48.3 | 2.0 | 33.5 | 47.5 | 0.9 | 1.7 |
| Control(4)[d] | 45.0 | 47.0 | 33.7 | 47.7 | 0 | 26.0 | 40.3 | 22.8 | 15.5 |
| Control[e] | 47.5 | 45.0 | 33.0 | 48.6 | 2.0 | 21.2 | 34.0 | 35.8 | 30.0 |
| Control[f] | 44.5 | 47.0 | 33.5 | 48.5 | 0 | 19.0 | 30.1 | 43.3 | 37.9 |

[a] L = Length
[b] W = Width
[c] Samples not exposed to the amine solution were soaked for an equivalent length of time in water.
[d] Fabric was exposed to 4% DDI solution but not to the amine solution.
[e] Fabric was exposed to the 2% amine solution but not to the DDI solution.
[f] Fabric was not exposed to a solution of either DDI or the amine.

Having thus described our invention, we claim:

1. A process for shrinkproofing and fulling a woolen fabric without significant impairment of its hand, which comprises
   (a) applying a diisocyanate as a solid interfacial coating to the fabric,
   (b) then, fulling the diisocyanate-treated fabric by agitating the same in water at ordinary temperature for a period of about 4 to 20 minutes, and
   (c) exposing the so-treated fabric to a solution of polyamine in water to form a polyurea in situ on the fabric by chemical reaction between the diisocyanate and the polyamine at the solid-liquid interface produced by the solid diisocyanate on the fibers and the solution of the polyamine.

2. The process of claim 1 wherein the diisocyanate has the formula $$OCN-(CH_2)_n-NCO$$

wherein n has a value of 2 to 40.

3. The process of claim 1 wherein the diisocyanate is bis-(4-isocyanatocyclohexyl) methane.

4. The process of claim 1 wherein the diisocyanate is an aliphatic diisocyanate containing 36 carbon atoms.

5. The process of claim 1 wherein the polyamine is a diamine.

6. The process of claim 5 wherein the diamine has the formula $$H_2N-(CH_2)_n-NH_2$$

wherein n has a value of 2 to 12.

7. The process of claim 1 wherein the polyamine is triethylene tetramine.

8. The process of claim 1 wherein soap is added to the water in Step b.

9. The process of claim 1 wherein the fabric is loosely knit from wool.

10. The process of claim 1 wherein the diisocyanate is applied in an inert, volatile solvent, and wherein the diisocyanate-treated fabric is dried to remove said solvent prior to fulling.

11. The process of claim 1 wherein said process is accomplished in essentially two apparatus,
   the first being a solvent processing unit wherein the fabric is exposed to a solution of the diisocyanate in an inert, volatile solvent, and then dried;
   the second being a washer-extractor wherein the fabric is first fulled by agitating the same in water and then exposed to an aqueous solution of the polyamine, the diisocyanate and the polyamines reacting in situ to form a polyurea on the surface of the fabric.

12. The process of claim 1 wherein said process is accomplished in essentially two apparatus,
   the first being a solvent processing unit wherein the fabric is (a) solvent extracted, (b) exposed to a solution of the diisocyanate, and (c) dried with solvent recovery;

the second being a washer-extractor wherein the fabric is (a) fulled by agitating the same in water, (b) exposed to the polyamine solution, (c) washed free of excess chemicals, (d) rinsed, and (e) hydro-extracted.

13. The process of claim 1 wherein the polyamine has the formula $$H_2N + C_2H_4 - NH)_{\overline{n}} C_2H_4 - NH_2$$

wherein n has a value of 0 to 5.